(12) United States Patent
Loehr et al.

(10) Patent No.: US 8,191,351 B2
(45) Date of Patent: Jun. 5, 2012

(54) INSENSITIVE ROCKET MOTOR

(75) Inventors: Richard D. Loehr, Tucson, AZ (US); Gerald M. Turner, Tucson, AZ (US); Jeremy C. Danforth, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 888 days.

(21) Appl. No.: 12/261,905

(22) Filed: Oct. 30, 2008

(65) Prior Publication Data

US 2011/0023449 A1 Feb. 3, 2011

(51) Int. Cl.
*F02K 9/08* (2006.01)
*F02K 9/38* (2006.01)

(52) U.S. Cl. ........................................... 60/256; 60/223

(58) Field of Classification Search .................... 60/256, 60/219, 223; 102/287, 291
See application file for complete search history.

(56) References Cited

U.S. PATENT DOCUMENTS

| | | | |
|---|---|---|---|
| 2,956,401 A | | 10/1960 | Kane |
| 3,137,126 A | * | 6/1964 | Madison ........................ 60/256 |
| 3,283,510 A | * | 11/1966 | Mangum et al. ................ 60/256 |
| 5,060,470 A | * | 10/1991 | VanName ....................... 60/253 |
| 5,466,537 A | | 11/1995 | Diede |
| 5,786,544 A | * | 7/1998 | Gill et al. ....................... 60/253 |
| 5,813,219 A | * | 9/1998 | Gill et al. ....................... 60/254 |
| 5,959,235 A | | 9/1999 | Wagstaff |
| H1824 H | * | 12/1999 | Johnsen et al. ............ 427/255.6 |
| 6,026,749 A | * | 2/2000 | Gordon et al. ................ 102/290 |
| 7,012,107 B2 | * | 3/2006 | Harvey et al. .................. 60/253 |
| 7,377,690 B1 | | 5/2008 | Diede |
| 7,762,195 B2 | * | 7/2010 | Friedlander et al. .......... 102/380 |

OTHER PUBLICATIONS

World Intellectual Property Organization, International Search Report and Written Opinion for International Application No. PCT/US2009/062849, mail date Jul. 30, 2010, pp. 1-7.

* cited by examiner

*Primary Examiner* — Ted Kim
(74) *Attorney, Agent, or Firm* — Renner, Otto, Boisselle & Sklar, LLP

(57) ABSTRACT

There is disclosed a solid fuel rocket motor including a center-perforated solid fuel grain. The solid fuel grain may be adapted to burn outwardly from a center surface facing the center perforation when ignited by a primary igniter during a normal mode of operation. The solid fuel grain may be further adapted to burn longitudinally from an end face when ignited by a secondary igniter during a safety mode of operation.

22 Claims, 9 Drawing Sheets

INSENSITIVE ROCKET MOTOR

GOVERNMENT INTERESTS

The United States Government has rights in this invention pursuant to Contract No. N00024-00-C-5390 between the United States Department of the Navy and Raytheon Company.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to rocket motors.

2. Description of the Related Art

Solid fuel rocket motors are commonly used in various configurations to propel rockets and missiles. Small solid fuel rocket motors may also be used to control the attitude and steering of a missile, rocket, or other projectile.

The thrust or force produced by a rocket motor is given by the equation $$F = m_p * U_e + (P_e - P_a) * A_e \quad (1)$$

where
$m_p$=propellant mass flow rate, and
$P_e$=Nozzle exit pressure
$P_a$=Ambient pressure
$A_e$=Nozzle exit area
$U_e$=gas velocity at nozzle exit plane.

The first term on the right side of equation (1) is the "momentum thrust" caused by the momentum of the exhaust flow from the rocket motor. The second term on the right side of equation (1) is the "pressure" thrust due to the pressure differential at the nozzle exit plane. Rocket motors are commonly designed such that the momentum thrust is the dominant component of the total thrust.

In some circumstances, a rocket motor may be designed to have an "optimum expansion ratio" such that the nozzle exit pressure and the ambient pressure are equal. In this case, the thrust or force produced by a rocket motor is due to the momentum thrust only, and is given by the equation $$F = m_p * U_e \quad (2)$$

The propellant mass flow rate $m_p$ is given by the equation $$m_p = A_p * R_b * P_p \quad (3)$$

where
$A_p$=propellant surface area,
$R_b$=propellant burn rate, and
$P_p$=propellant density.

Thus the propellant surface area $A_p$ is one of the factors that may be used to control the thrust produced by a solid fuel rocket.

Insensitive munitions are munitions that minimize the probably of inadvertent ignition or detonation, and which minimize the severity of collateral damage to weapons platforms, other equipment and personnel if inadvertent ignition should occur. Specifically, an insensitive rocket motor is a motor that does not react more violently than burning when subjected to slow or fast heating; fragment, bullet, spall, or shaped charge impact; or detonation of an adjacent similar motor. Requirements for insensitive munitions are generally described in MIL-STD-2105B, Hazard Assessment Test for Non-Nuclear Ordinance. Specific test requirements are described in NATO STANAG (Standardization Agreement) documents.

Of particular interest for this patent are the "fast cookoff" and "slow cookoff" tests defined in STANAG 4240 and STANAG 4382. A fast cookoff test is intended to simulate an accidental fire aboard a ship or in an ammunition storage facility. During a fast cookoff test, the ordnance under test is suspended above a pool of burning aviation fuel. In a slow cookoff test, the temperature of the ordnance is increased at a rate of 3.3° C. per hour until a reaction occurs. To minimize the test time, the test may be started at a temperature 55° C. below the anticipated ignition temperature of the ordnance. In either test, the most severe reaction allowed is burning. In the case of a rocket motor, it is permissible for the fuel within the motor to burn but the motor may not produce thrust sufficient to allow the rocket to launch.

Insensitive rocket motors generally include a propellant material that does not ignite due to the impact of a bullet, fragment or shaped charge. Insensitive rocket motors generally also include some method to control the pressure within the rocket motor to prevent detonation and to limit the thrust produced by the rocket motors. A known way to limit the pressure within rocket motors is to include vents or other forms of pressure relief that are activated by high temperature or fire external to the rocket motor.

Throughout this description, elements appearing in figures, other than graphs, are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Description of Apparatus

Figure 1:
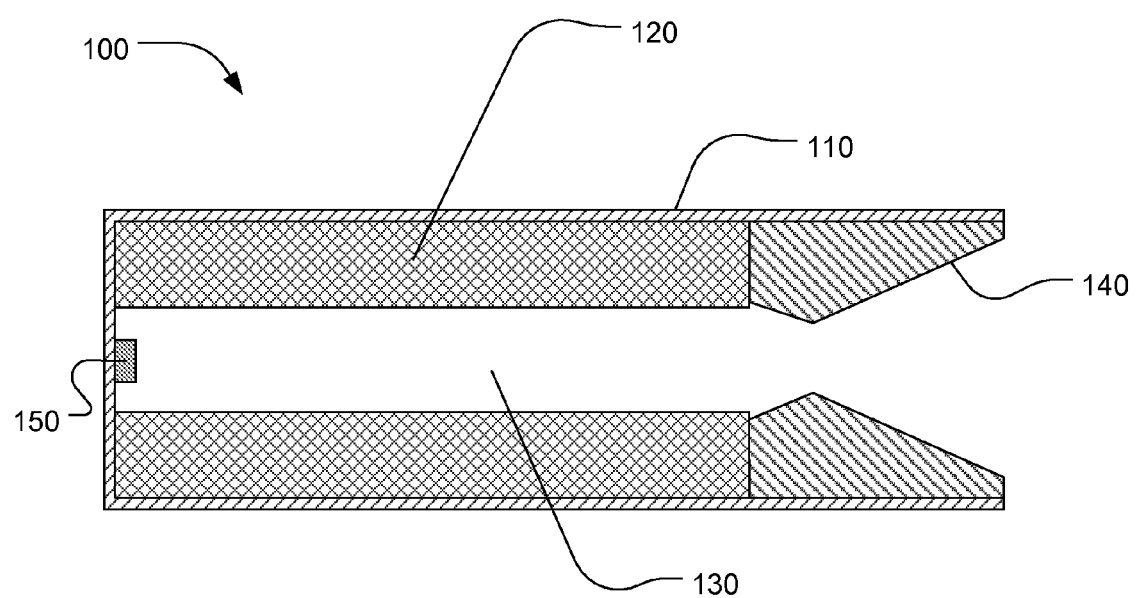
FIG. 1 is a schematic cross-sectional view of a conventional solid fuel rocket motor.

Referring now to the schematic cross-section view of FIG. 1, a conventional rocket motor 100 typically includes a case 110, a solid fuel propellant charge 120, a nozzle 140, and an igniter 150. The solid fuel propellant charge 120 is commonly termed the "grain", and this term will be used within this description. Note that the term "grain" is used to describe the propellant charge 120 as a whole, but does not refer to the weight of the propellant charge, the particle size of the material composing the propellant charge, or the surface texture of the propellant charge.

In order to increase the surface area of the grain 120 to provide higher thrust, a longitudinal cavity 130, commonly termed a "center perforation", is often formed in the grain 120. The longitudinal cavity 130 is typically centered on the longitudinal axis of the case 110. Once the grain 120 is ignited by the igniter 150, the burning area can rapidly spread to include the entire surface of the longitudinal cavity 130 and, in some cases, the end of the grain proximate to the nozzle 140. A grain with a longitudinal opening, such as grain 120 with a longitudinal cavity 130, is commonly termed a "center-perforated grain" or an "inside burning grain".

The igniter 150 is usually a small charge of flammable material that, when burned, releases a predetermined amount of hot combustion gases. The combustion of the igniter can be initiated, for example, by an electric current flowing through a heater wire (not shown) adjacent to, or embedded in, the flammable igniter material. In order to ignite the grain 120, the temperature and pressure of the gases produced by the igniter 150 must both exceed predetermined values required to ensure ignition of the grain 120.

Since the ignition of the grain starts at the end proximate to the igniter 150 and then proceeds along the length of the center perforation 130, the center perforation 130 is often tapered slightly (not shown) to maintain a relatively constant burning surface area as the grain is consumed. The center perforations 130 of known rocket motors have had circular cross sections, "keyhole"-shaped cross sections, star-shaped cross sections, finocyl cross sections (slots extending radially from a circular center), or other cross sectional shapes.

Figure 2A:
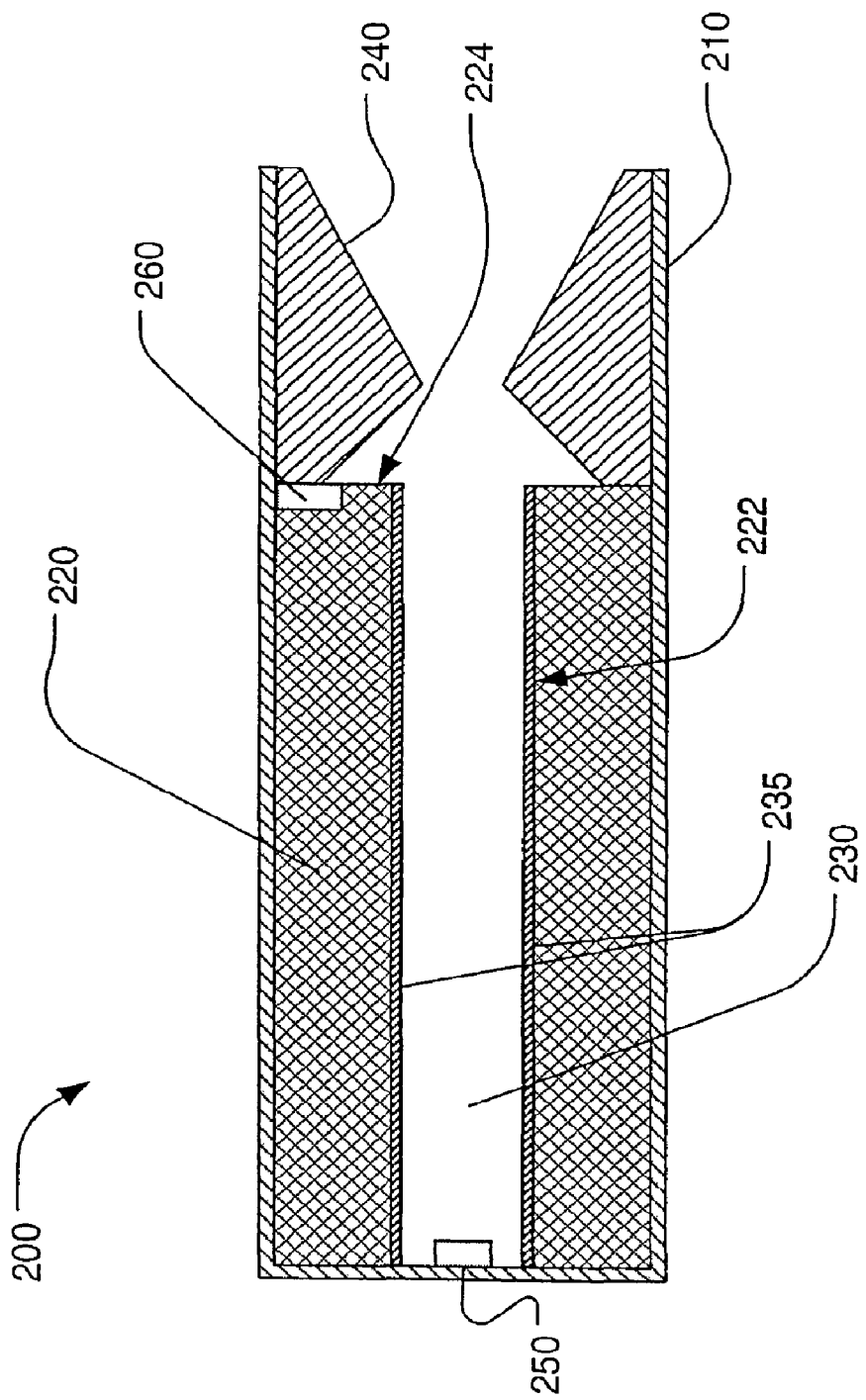
FIG. 2A is a schematic cross-sectional view of an insensitive solid fuel rocket motor.
Figure 2B:
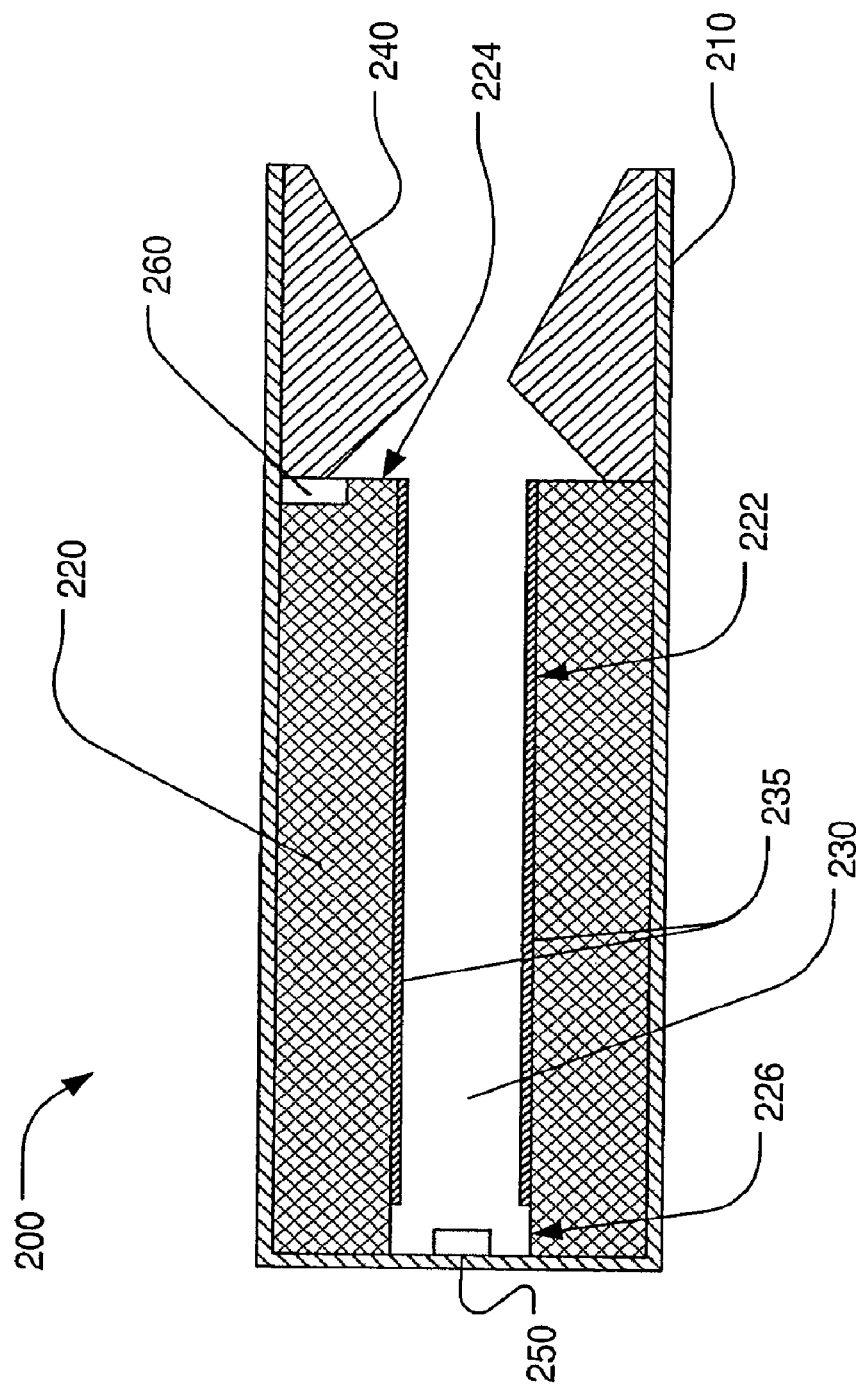
FIG. 2B is a schematic cross-sectional view of an insensitive solid fuel rocket motor.

Referring now to the schematic cross-section view of FIGS. 2A and 2B, an insensitive rocket motor 200 may include a case 210, a grain 220 having a center perforation 230, a nozzle 240, and a primary igniter 250. These components may function essentially as described with respect to the conventional rocket motor 100. The insensitive rocket motor 200 may include an inhibitor 235 disposed on a center surface 222 of the grain 220 facing the center perforation 230. The insensitive rocket motor 200 may also include a secondary igniter 260 disposed at or near an end surface 224 of the grain 220 adjacent to the nozzle 240.

The grain 220 may be any solid fuel propellant material. The grain may be, for example, a composite propellant material such as a hydroxl-terminated polybutadiene (HTPD) binder containing ammonium perchlorate oxidizer particles and aluminum fuel particles. The grain 220 may be, for further example, a double-base propellant material composed primarily of nitroglycerine and nitrocellulose.

The inhibitor 235 may be one or more coatings or layers of slow-burning or nonburning materials that inhibit ignition of the underlying grain surface when the grain is ignited by the secondary igniter, but do not appreciably inhibit ignition of the grain by the primary igniter. To perform this function, the inhibitor 235 may be, or may include, a material that provides thermal insulation at lower temperatures and that burns, vaporizes, decomposes, or is otherwise removed when directly exposed to the hot gases produced by the combustion of the primary igniter 250 or the grain 220. The inhibitor 235 may cover the entire center surface 222 of the grain 220, as is shown in FIG. 2A. To ensure that the primary igniter 250 reliably ignites the grain 220, a portion 226 of the surface 222 adjacent to the primary igniter 250 may not be covered by the inhibitor 235, as is shown in FIG. 2B.

To reliably perform the required function over the lift of a rocket motor, the inhibitor 235 needs to be chemically and mechanically stable even after prolonged exposed to the anticipated highest ambient temperature for the rocket motor. Further, to avoid potential degradation of the rocket motor during prolonged storage, the inhibitor 235 needs to be chemically compatible with the grain 220. Additionally, to perform the required function, the inhibitor 235 needs to adhere to the grain after high and low temperature excursions and shock, vibration, and other mechanical stresses. The inhibitor 235 may be a soft or flexible material that will not crack during coating, handling, or temperature excursions.

Suitable materials for the inhibitor 235 may include a polymeric rubber material such as ethylene propylene diene monomer rubber (EPDM) or hydroxyl functionalized polybutadiene rubber, a polymer material such polyurethane (PU), or another material. The inhibitor may include a plurality of layers or material such as, for example, a thermal insulating layer coupled to the surface of the grain by an adhesion layer. One or more layers of the inhibitor 235 may include a filler material or additives that control the rate at which the inhibitor 235 burns, vaporizes, decomposes, or is otherwise removed from the surface 222 of the grain 220. The filler material or additives may include an energetic material that increases the burn rate of the inhibitor 235.

The inhibitor may function as a thermal insulator that inhibits ignition of the surface of the grain 220 by insulating the grain 220 from the heat of the hot gases produced by combustion of other portions of the grain 220. One or more layers of the inhibitor 235 may include a filler material or additives that control the thermal conductivity of inhibitor 235 to control the rate at which the surface 222 of the grain 220 ignites.

The inhibitor 235 may be applied to the center surface 222 of the grain 220 by painting, dipping, spraying, adhesive bonding, casting or other application method. The thickness of the inhibitor 235 may depend on the inhibitor material composition and application method. The thickness of the inhibitor 235 may be sufficient to perform the function of preventing or delaying ignition of the surface of the grain 220 covered by the inhibitor. A thickness of 2.5 to 3.0 millimeters may be appropriate for an inhibitor layer consisting of a foam material such as polyurethane foam. A thickness of about 1.0 millimeter may be appropriate for a rubber material painted onto the surface 222 of the grain 220. In the case of inhibitors including multiple layers, the layers may be of different thickness and may be applied by the same or different methods.

The primary igniter 250 may be a conventional solid fuel rocket motor igniter. The primary igniter may be, for example, primarily composed of Boron Potassium Nitrate (BKNO3) or Zinc Potassium Perchlorate (ZPP). The primary igniter 250 may be triggered by an electrical impulse sent through a heater wire within or adjacent to the igniter material.

The grain 220 may spontaneously ignite if the rocket motor 200 is heated to a temperature of 160° C. to 190° C. during a slow cookoff or fast cookoff test. Spontaneous ignition of the grain 220 may result in rapid combustion of the grain material producing a high level of thrust or possible detonation of the rocket motor.

To avoid spontaneous ignition of the grain 220, the secondary igniter 260 may be adapted to ignite at a predetermined temperature to controllably burn at least a substantial portion of the grain before the temperature of the entire grain reaches the spontaneous ignition temperature. The secondary igniter 260 may be, for example, an intermetallic thermal sensor such as the intermetallic thermal sensors described in U.S. Pat. Nos. 5,466,537 and 7,377,690. The secondary igniter 260 may be another type of thermal sensor effective to ignite the grain 220. The ignition temperature of the secondary igniter 260 may be substantially below the spontaneous ignition temperature of the grain. The ignition temperature of the secondary igniter 260 may be substantially higher than the highest anticipated ambient temperature, which may be up to 85° C., for the rocket motor 200 under normal storage and use conditions. For example, the ignition temperature of the secondary igniter 260 may be from 115° C. to 140° C. Once the temperature of the secondary igniter 260 increases to its ignition temperature, the secondary igniter 260 may initiate a controlled slow burn of the grain 220.

Figure 3:
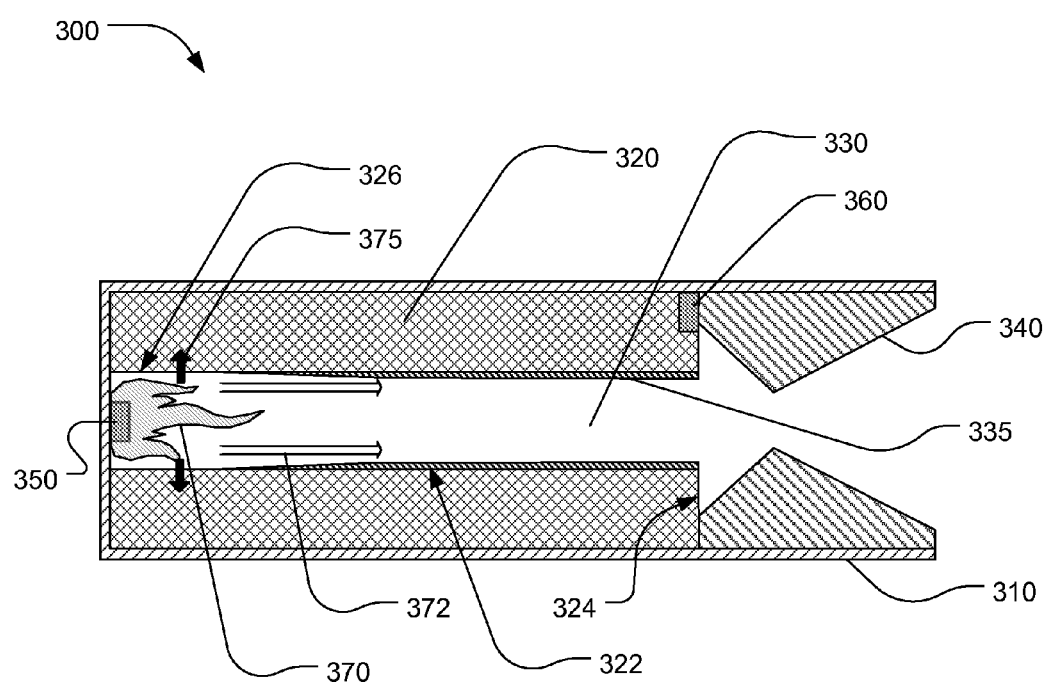
FIG. 3 is a schematic cross-sectional view of an insensitive solid fuel rocket motor during ignition in a normal mode of operation.

FIG. 3 shows a schematic cross-sectional view of an insensitive rocket motor 300 including a grain 320 having a center perforation 330, a nozzle 340, a primary igniter 350, and an inhibitor layer 335 coating a center surface 322 of the grain 320 facing the center perforation 330. The insensitive rocket motor 300 may also include a secondary igniter 360 disposed at or near an end surface 324 of the grain 320 adjacent to the nozzle 340. FIG. 3 shows the rocket motor 300 during ignition in a normal mode of operation. The normal mode of operation may include igniting the solid fuel grain 320 using the primary igniter 350 and then burning the solid fuel grain 320 outwardly from the center perforation 330. In the normal mode of operation, the insensitive rocket motor 300 may operate in essentially the same manner as a conventional rocket motor, such as the rocket motor 100. By design, in the normal mode of operation, the insensitive rocket motor 300 may produce the same amount of thrust for the same time interval as a conventional rocket motor, such as the rocket motor 100.

To ignite the insensitive rocket motor 300 in the normal mode of operation, the primary igniter 350 may be fired by an electric current or other mechanism. The primary igniter may produce hot combustion gases 370. The hot combustion gases may impinge upon the inhibitor coating 335. The hot combustion gases may impinge upon a portion 326 of the surface 322 of the grain 320 which lacks an inhibitor coating. The primary igniter 350, the grain 320, and the inhibitor coating 335 may be adapted such that the hot combustion gases 370 rapidly remove the inhibitor coating from a portion 326 of the center surface 322.

The hot combustion gases 370 may ignite at least a portion of the surface 322 of the solid fuel grain 320 which did not have an inhibitor coating, or where the inhibitor coating has been removed. Once ignited, the solid fuel grain 320 may burn in a direction orthogonal to the burning surface, as indicated by solid arrows 375. The ignited portion of the surface 326 of the solid fuel grain may produce additional combustion gases which, together with the gases produce by the primary igniter 350, flow longitudinally through the center perforation (as indicated by arrows 372) to the nozzle. Due to the flow of hot combustion gases along the center surface 322 of the solid fuel grain 320, the inhibitor layer 325 may be rapidly removed from the entire area of the center surface 322 and the entire center surface may be ignited.

The time required to remove the inhibitor coating 325 from the center surface 322 may slightly delay the ignition of the rocket motor 300. This delay may be offset, at least in part, by using a larger or more energetic primary igniter 350.

Figure 4:
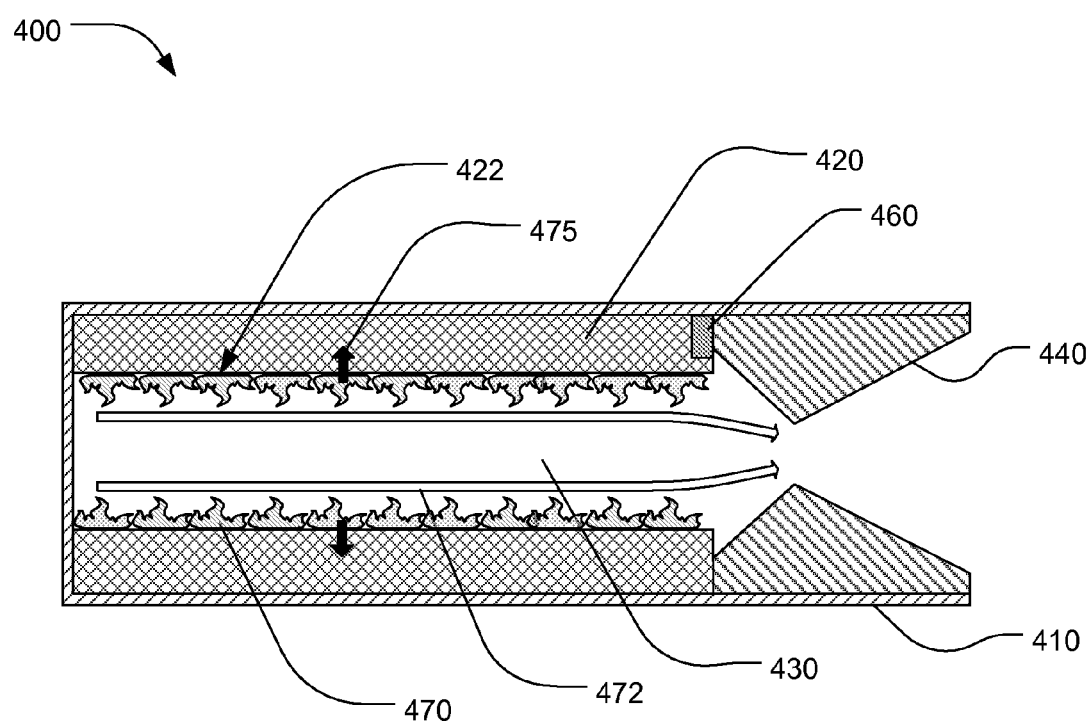
FIG. 4 is a schematic cross-sectional view of an insensitive solid fuel rocket motor during the normal mode of operation.

FIG. 4 shows a schematic cross-sectional view of an insensitive rocket motor 400, including a solid fuel grain 420 having a center perforation 430, and a nozzle 440. FIG. 4 shows the insensitive rocket motor 400 after roughly 50% of the solid fuel grain 420 has been consumed during a normal mode of operation. An entire center surface 422 of the solid fuel grain 420 facing the center perforation 430 may be burning and producing hot combustion gases 470. The burn may be progressing outwardly from the center perforation 430, as indicated by solid arrows 475. The hot combustion gases 470 may flow longitudinally through the center perforation 430, as indicated by open arrows 472. The hot combustion gases may exit the rocket motor 400 through the nozzle 440 to produce thrust. In the normal mode of operation, the insensitive rocket motor 400 may operate in essentially the same manner as a conventional rocket motor, such as the rocket motor 100.

Figure 5:
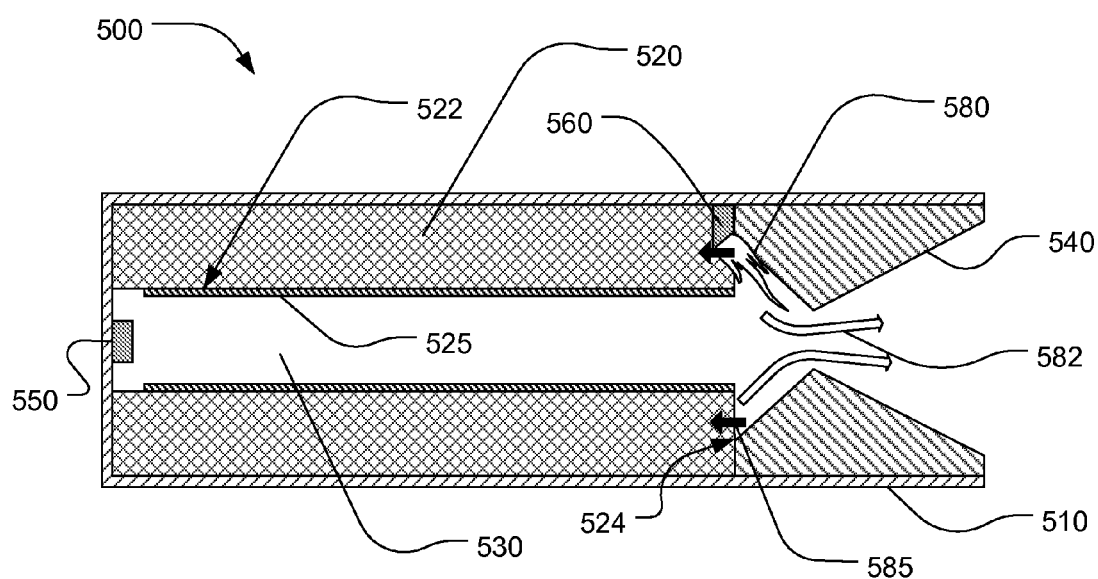
FIG. 5 is a schematic cross-sectional view of an insensitive solid fuel rocket motor during ignition in a safety mode of operation.

FIG. 5 shows a schematic cross-sectional view of an insensitive rocket motor 500, including a solid fuel grain 520 having a center perforation 530, a nozzle 540, a primary igniter 550, and an inhibitor layer 535 coating a center surface 522 of the solid fuel grain 520 facing the center perforation 530. The insensitive rocket motor 500 may also include a secondary igniter 560 disposed at or near an end surface 524 of the grain 520 adjacent to the nozzle 540. FIG. 5 depicts the solid fuel rocket motor 500 being ignited in a safety mode of operation. The safety mode of operation may include igniting the solid fuel grain 520 using the secondary igniter 560 and then burning the solid fuel grain 520 longitudinally from the end surface 524. In the safety mode of operation, the insensitive rocket motor 500 may produce substantially less thrust than a conventional rocket motor, such as the rocket motor 100.

To ignite the insensitive rocket motor 500 in the safety mode of operation, the secondary igniter 560 may ignite in response to externally applied heat. The ignition of the secondary igniter 560 may produce hot combustion gases 580. The hot combustion gases may flow out of the rocket motor 500 through the nozzle 540, as indicated by open arrows 582. Since the secondary igniter 560 may be disposed within the rocket motor 500 proximate to the nozzle 540, the hot combustion gases 580 produced by the secondary igniter 560 may not flow longitudinally through the center perforation 530. Thus the hot combustion gases 580 may not be effective to remove the inhibitor coating 525 from the center surface 522 of the solid fuel grain 520.

The hot combustion gases 580 may also ignite at least a portion of the end surface 524 of the solid fuel grain. Once ignited, the solid fuel grain may burn in a direction orthogonal to the burning end surface 524, as indicated by solid arrows 585. The ignited portion of the end surface 524 may produce additional combustion gases which may also flow through the nozzle. Since hot combustion gases do not flow along the center surface 522 of the solid fuel grain 520, the inhibitor layer 525 may remain in place and prevent all or most of the center surface 522 from igniting.

Figure 6:
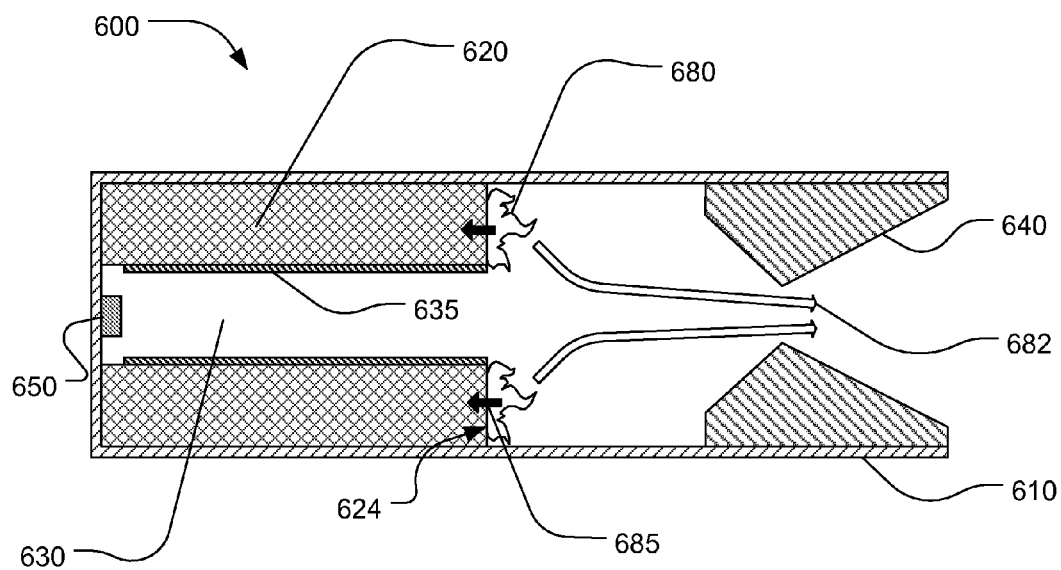
FIG. 6 is a schematic cross-sectional view of an insensitive solid fuel rocket motor during the safety mode of operation.

FIG. 6 shows a schematic cross-sectional view of an insensitive rocket motor 600, including a solid fuel grain 620 having a center perforation 630, a nozzle 640, a primary igniter 650, and an inhibitor layer 635 coating a center surface 622 of the grain 620 facing the center perforation 630. FIG. 6 depicts the insensitive rocket motor 600 after roughly 50% of the solid fuel grain 620 has been consumed during a safety mode of operation. An end surface 624 of the solid fuel grain 620 may be burning and producing hot combustion gases 680. The burn may be progressing longitudinally from the end surface 624, as indicated by solid arrows 685. The hot combustion gases 680 may exit the rocket motor 600 through the nozzle 640.

The thrust resulting from the hot combustion gases exiting through the nozzle may be substantially less than the thrust produced in a normal mode of operation as described in conjunction with FIG. 3 and FIG. 4. Combining equations (1) and (2), the momentum thrust produced by a rocket motor is given by the equation $$F = A_p * R_b * P_p * U_e \qquad (4)$$

where
$A_p$=propellant surface area,
$R_b$=propellant burn rate,
$P_p$=propellant density, and
$U_e$=gas velocity at nozzle exit plane.

Consideration of FIG. 4 and FIG. 6 shows that the burning surface area in a safety mode of operation may be substantially less than the burning surface area in a normal mode of operation. For typically solid fuel grain geometries, the burning surface area in the safety mode of operation may be less than 10% of the burning surface area in the normal mode of operation. The reduction in burning surface area, of itself, would reduce the thrust of a rocket motor proportionally. However, the reduction in burning surface area may also reduce the rate of production of combustion gases and thus may reduce the pressure within the rocket motor. Reduced pressure within the motor may result in both a reduction in propellant burn rate and a reduction in the gas velocity at the nozzle exit plane. All of these factors may compound to reduce the thrust produced by the rocket motor in the safety mode of operation.

In some circumstances, such as long, small-diameter rocket motors, burning the solid fuel grain 620 from an end may subject the case 610 and nozzle 640 of the rocket motor to prolonged high temperatures and may lead to thermal failure of the case and/or nozzle. To prevent thermal failures, the thickness and/or composition of the inhibitor 635 may be selected to control the total time required to burn the grain 620. Shortening the total burn time may result in an increase in thrust produced when the rocket motor is burned in the safety mode of operation. The thickness and/or composition of the inhibitor 635 may be selected as a compromise between the thrust produced and the thermal stresses on the case and nozzle when the rocket motor is burned in the safety mode of operation.

Figure 7:
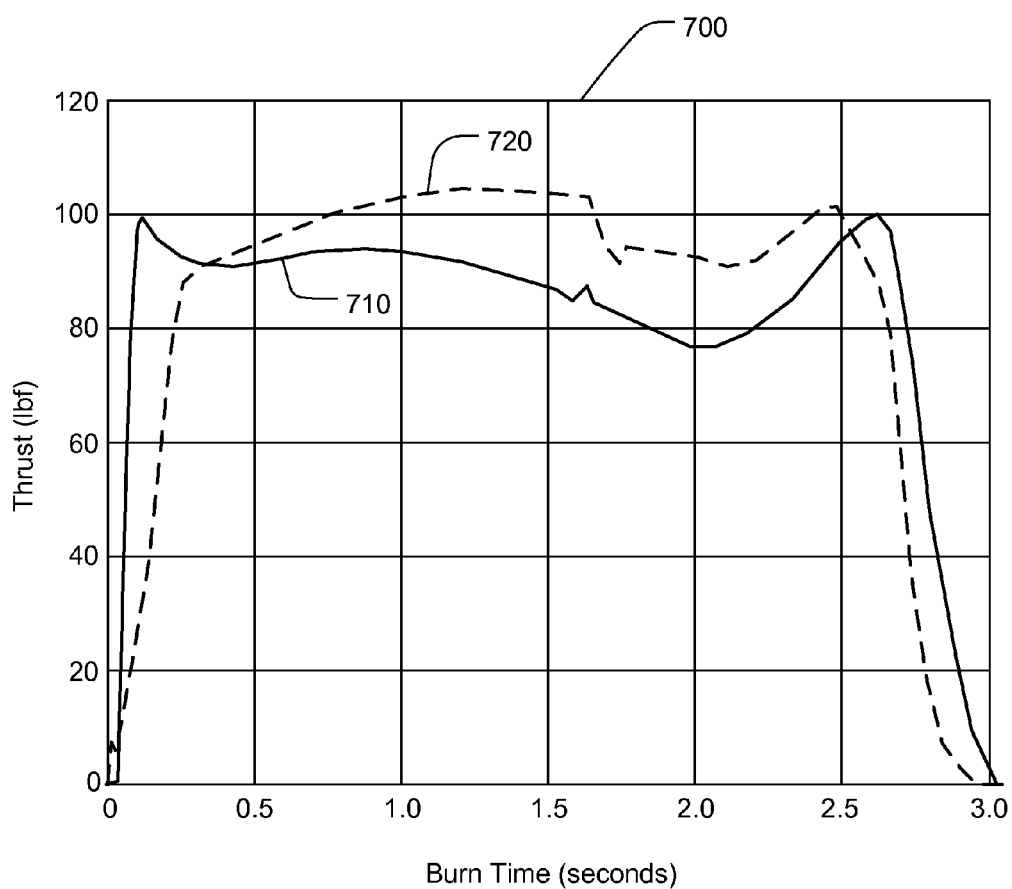
FIG. 7 is a graph comparing the thrust produced by a conventional rocket motor and an insensitive rocket motor.

FIG. 7 shows a graph 700 of the measured thrust produced by experimental solid fuel rocket motors with and without an inhibitor layer. The solid line 710 is a plot of the thrust produced by an experimental rocket motor without an inhibitor layer. The dashed line 720 is the thrust produced by a similar rocket motor with an inhibitor layer. Both motors had a composite grain about 240 mm in length and about 50 mm in diameter with a 12 mm diameter center opening. Both motors were ignited by a primary igniter and burned in the normal mode of operation.

Comparison of the solid line 710 and the dashed line 720 shows that the thrust and total impulse (integral of thrust over time) produced by the two motors are essentially the same. The time delay from ignition until each motor produces 90 pounds (400 Newtons) of force is about 100 milliseconds for the motor without an inhibitor (solid line 710) and 250 milliseconds for the motor having an inhibitor layer (dashed line 720). The relatively slower ignition of the motor having an inhibitor layer may be due to the gradual removal of the inhibitor layer along the length of the rocket motor.

Figure 8:
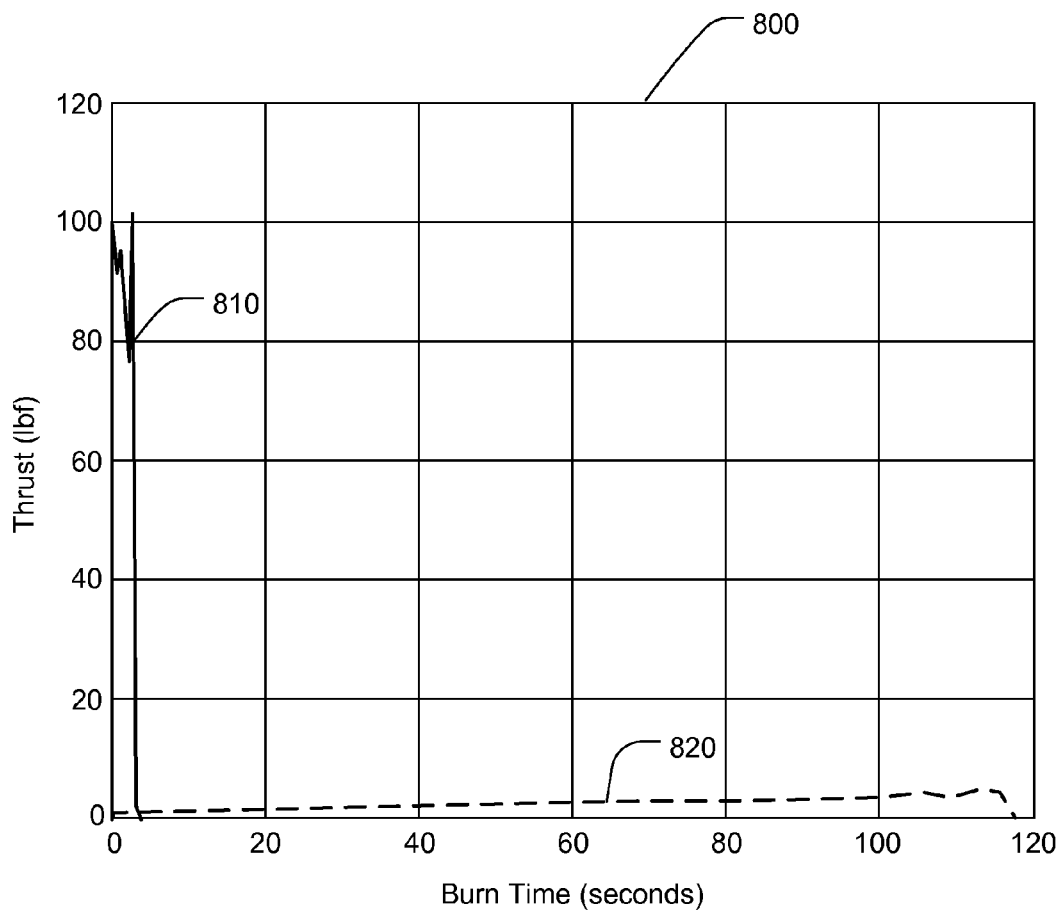
FIG. 8 is a graph showing the thrust produced by an insensitive rocket motor.

FIG. 8 shows a graph 800 of the measured thrust produced by experimental solid fuel rocket motors burning in the normal mode of operation and the safety mode of operation. The solid line 810 is a plot of the thrust produced by an experimental rocket motor without an inhibitor layer burning normally after being ignited by a primary igniter. The dashed line 820 is the thrust produced by a similar rocket motor with an inhibitor layer burning in the safety mode of operation after being ignited by an igniter disposed at the tail end of the motor proximate to the nozzle. Both motors had a composite grain 240 mm in length and 35 mm in diameter with a 12 mm diameter center opening.

The solid line 810 shows that the experimental rocket motor produces, in the normal mode of operation, about 100 pounds of thrust for 3.5 seconds (as shown in FIG. 7). The dashed line 820 shows that the experimental rocket motor burns, in the safety mode of operation, for 115 seconds and produces less than 5 pounds of thrust.

The experimental data of FIG. 8 demonstrates that the combination of an inhibitor layer and an aft-end secondary igniter can be effective to greatly increase the burn-time of a rocket motor ignited during a fast or slow cookoff test. The increase in burn time may result in a corresponding reduction in the thrust produced by the motor. Further, the experimental data of FIG. 7 shows that the improvement in rocket motor performance during a fast or slow cookoff test can be achieved with little impact on the motor performance during normal operation.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

For means-plus-function limitations recited in the claims, the means are not intended to be limited to the means disclosed herein for performing the recited function, but are intended to cover in scope any means, known now or later developed, for performing the recited function.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A solid fuel rocket motor, comprising:
    a solid fuel grain;
    a primary igniter; and
    a secondary igniter embedded in an end surface of the solid fuel grain;
    wherein the solid fuel grain adapted to 1) burn outwardly from a center surface facing a center perforation when ignited by the primary igniter, and 2) burn longitudinally from the end face when ignited by the secondary igniter;
    wherein the secondary igniter ignites the end face of the solid fuel grain when the temperature of the secondary igniter exceeds a predetermined ignition temperature;
    wherein the rocket motor further comprises an inhibitor layer to inhibit ignition of the center surface of the solid fuel grain when the grain is ignited by the secondary igniter;
    wherein the solid fuel rocket motor produces a first level of thrust when ignited by the primary igniter; and
    wherein the solid fuel rocket motor produces a second level of thrust substantially lower than the first level of thrust when ignited by the secondary igniter.

2. The solid fuel rocket motor of claim 1, wherein the predetermined ignition temperature is less than a spontaneous ignition temperature of the solid fuel grain.

3. The solid fuel rocket motor of claim 1, wherein the inhibitor layer comprises a material selected from the group consisting of ethylene propylene diene monomer rubber, hydroxyl functionalized polybutadiene rubber, and polyurethane.

4. The solid fuel rocket motor of claim 1, wherein the inhibitor layer coats at least a portion of the center surface of the solid fuel grain.

5. The solid fuel rocket motor of claim 1, wherein the inhibitor layer coats the entire center surface of the solid fuel grain.

6. The solid fuel rocket motor of claim 1, further comprising a nozzle disposed proximate to the end face of the solid fuel grain.

7. The solid fuel rocket motor of claim 1, further comprising the primary igniter to ignite at least a portion of the center surface of the solid fuel grain during a normal mode of operation.

8. The solid fuel rocket motor of claim 7, wherein at least a portion of the center surface of the solid fuel grain proximate to the primary igniter is not coated with the inhibitor layer.

9. The solid fuel rocket motor of claim 7, wherein combustion gases produced by ignition of the primary igniter both 1) remove the inhibitor coating from at least a portion of the center surface of the solid fuel grain, and 2) ignite at least a portion of the center surface of the solid fuel grain lacking the inhibitor coating.

10. A solid fuel rocket motor, comprising:
    a solid fuel grain having an end surface, and a center surface facing a center perforation;
    an inhibitor layer coating at least a portion of the center surface;
    a primary igniter disposed to ignite the center surface;
    a secondary igniter embedded in the end surface, and disposed to ignite the end surface;
    a case having a longitudinal axis terminating in a fore end and an aft end, the case at least partially enclosing the solid fuel grain, the primary igniter, and the secondary igniter; and
    a nozzle coupled to the aft end of the case proximate to the end surface of the solid fuel grain, the nozzle to exhaust combustion gases produced by combustion of the solid fuel grain;
    wherein the secondary igniter is adapted to ignite in response to externally applied heat; and
    wherein the secondary igniter has a first ignition temperature lower than a spontaneous ignition temperature of the solid fuel grain.

11. The solid fuel rocket motor of claim 10,
    wherein the primary igniter is disposed at the fore end of the case; and
    wherein the center perforation provides a passage for combustion gases from the primary igniter to the nozzle.

12. The solid fuel rocket motor of claim 11, wherein the primary igniter and the inhibitor layer are adapted such that, upon ignition of the primary igniter, combustion gases produced by the primary igniter remove the inhibitor coating from at least a portion of the center surface of the solid fuel grain.

13. The solid fuel rocket motor of claim 12, wherein the primary igniter and the solid fuel grain are adapted such that the combustion gases produced by the primary igniter cause ignition of at least a portion of the center surface of the solid fuel grain.

14. The solid fuel rocket motor of claim 10, wherein the secondary igniter is adapted to ignite the end face of the solid fuel grain during at least one of a fast cookoff test and a slow cookoff test.

15. The solid rocket fuel motor of claim 10, wherein the secondary igniter includes an intermetallic thermal sensor.

16. The solid rocket fuel motor of claim 15, wherein the primary igniter includes igniter material that is triggered by an electrical impulse.

17. A solid fuel rocket motor, comprising:
    a solid fuel grain having an end surface, and a center surface facing a center perforation;
    an inhibitor layer coating at least a portion of the center surface;
    a primary igniter disposed to ignite the center surface;
    a secondary igniter disposed to ignite the end surface;
    a case having a longitudinal axis terminating in a fore end and an aft end, the case at least partially enclosing the solid fuel grain, the primary igniter, and the secondary igniter; and
    a nozzle coupled to the aft end of the case proximate to the end surface of the solid fuel grain, the nozzle to exhaust combustion gases produced by combustion of the solid fuel grain;
    wherein the secondary igniter is adapted to ignite in response to externally applied heat;
    wherein the secondary igniter has a first ignition temperature lower than a spontaneous ignition temperature of the solid fuel grain; and
    wherein the nozzle abuts the secondary igniter, but leaves a portion of the secondary igniter uncovered.

18. The solid fuel rocket motor of claim 17,
    wherein the solid fuel rocket motor produces a first level of thrust when ignited by the primary igniter; and
    wherein the solid fuel rocket motor produces a second level of thrust substantially lower than the first level of thrust when ignited by the secondary igniter.

19. The solid fuel rocket motor of claim 17, wherein the secondary igniter is adapted to ignite the end face of the solid fuel grain during at least one of a fast cookoff test and a slow cookoff test.

20. The solid rocket fuel motor of claim 17,
wherein the primary igniter is disposed at the fore end of the case; and
wherein the center perforation provides a passage for combustion gases from the primary igniter to the nozzle.

21. The solid rocket fuel motor of claim 17, wherein the secondary igniter includes an intermetallic thermal sensor.

22. The solid rocket fuel motor of claim 21, wherein the primary igniter includes igniter material that is triggered by an electrical impulse.

* * * * *